United States Patent
Eckardt et al.

(10) Patent No.: US 6,294,126 B1
(45) Date of Patent: Sep. 25, 2001

(54) PROCESS FOR CONTROLLING GAS BLANKET EXTENT IN PLASTICS INJECTION MOLDING

(75) Inventors: Helmut Eckardt; Michael Gosdin, both of Meinerzhagen (DE)

(73) Assignee: Battenfeld GmbH (DE)

( * ) Notice: Subject to any disclaimer, the term of this patent is extended or adjusted under 35 U.S.C. 154(b) by 0 days.

(21) Appl. No.: 09/162,007

(22) Filed: Sep. 28, 1998

(30) Foreign Application Priority Data

Oct. 4, 1997 (DE) .............................................. 197 43 838

(51) Int. Cl.⁷ .................................................. B29C 45/73
(52) U.S. Cl. ........................ 264/500; 264/519; 264/572; 264/328.16
(58) Field of Search ................................. 264/40.1, 40.3, 264/40.6, 572, 328.16, 519, 500

(56) References Cited

U.S. PATENT DOCUMENTS

| | | |
|---|---|---|
| 2,435,610 | 2/1948 | Schneider . |
| 2,615,229 | 10/1952 | Blackburn et al. . |
| 3,044,118 | 7/1962 | Bernhardt et al. . |
| 3,345,687 | 10/1967 | Marx . |

(List continued on next page.)

FOREIGN PATENT DOCUMENTS

| | | | |
|---|---|---|---|
| 37 34 164 C2 | 9/1996 | (DE) | ............... B29C/45/00 |
| 195 16 290 C2 | 9/1997 | (DE) | ............... B29C/45/00 |
| 0 127 961 | 12/1984 | (EP) | ................. B29F/1/00 |
| 0 283 207 A2 | 9/1988 | (EP) | ............... B29C/45/17 |
| 0 593 308 A1 | 4/1994 | (EP) | ............... B29C/45/56 |
| 0 592 525 B1 | 10/1996 | (EP) | ............... B29C/45/17 |
| 0 763 413 A2 | 3/1997 | (EP) | ............... B29C/45/17 |
| 0 764 510 A2 | 3/1997 | (EP) | ............... B29C/45/17 |
| 2.105.498 | 4/1972 | (FR) | ................. B29F/1/00 |
| 2.156.558 | 6/1976 | (FR) | ................. B29F/1/00 |
| 2 278 308 A | 11/1994 | (GB) | ............... B29C/45/17 |
| 43-7462 | 3/1943 | (JP) | . |
| 50-75247 | 6/1975 | (JP) | ................. B29F/1/00 |
| 55-113539 | 9/1980 | (JP) | ............... B29F/1/100 |
| 59220338 | 12/1984 | (JP) | ................. B29F/1/00 |
| 60-8022 (A) | 1/1985 | (JP) | ............... B29C/45/00 |
| 61-12312(A) | 1/1986 | (JP) | ............... B29C/45/14 |
| 61-12313(A) | 1/1986 | (JP) | ............... B29C/45/14 |

(List continued on next page.)

*Primary Examiner*—Jill L. Heitbrink
(74) *Attorney, Agent, or Firm*—Hamilton, Brook, Smith & Reynolds, P.C.

(57) ABSTRACT

A process and a device for the injection molding of plastic objects of thermoplastic, duraplastic, or elastomeric material implements the steps of: a) injecting a sufficient quantity of molten plastic into cavity (2) of a mold (1) along a melt flow path, which extends from a unit (4,5) for plasticizing and injecting the plastic through a plastic injection nozzle (3) into mold (1); b) introducing a pressurized fluid, particularly a pressurized gas, from a wall (7) of cavity (2) through at least one fluid injection element (6), so that a fluid blanket (8) forms between wall (7) of cavity (2) and the plastic introduced into the mold; c) allowing the molded part thus produced to harden; d) relieving the cavity (2) of the pressure of the pressurized fluid; and e) demolding the molded part. It is provided according to the invention that at least one surface projection (9) is provided in the mold (1), on the cavity wall (7), such that its upper plateau (10) runs extensively parallel to the cavity wall (7). The pressurized fluid is injected by means of at least one fluid injection element (6) in the region of upper plateau (10) of the surface projection (9), such that fluid blanket (8) forms between the plastic and upper plateau (10) of surface projection (9). Thus, the fluid blanket is controlled to be limited in its extent.

11 Claims, 7 Drawing Sheets

U.S. PATENT DOCUMENTS

| | | |
|---|---|---|
| 4,164,523 | 8/1979 | Hanning . |
| 4,201,742 | 5/1980 | Hendry ................................ 264/45.5 |
| 4,295,811 | 10/1981 | Sauer ................................... 425/112 |
| 4,309,380 | 1/1982 | Sauer ................................... 264/511 |
| 4,474,717 | 10/1984 | Hendry ................................ 264/45.5 |
| 4,531,703 | 7/1985 | Underwood . |
| 4,740,150 | 4/1988 | Sayer ................................... 425/542 |
| 4,755,128 | 7/1988 | Alexander et al. ................... 425/292 |
| 4,948,547 | 8/1990 | Hendry ................................ 264/500 |
| 5,273,707 | 12/1993 | Carroll ................................. 264/572 |
| 5,284,691 | 2/1994 | Taniguchi et al. . |
| 5,344,596 | 9/1994 | Hendry ................................ 264/40.3 |
| 5,439,365 | 8/1995 | Hendry ................................ 425/130 |
| 5,458,846 | 10/1995 | Carroll ................................. 264/572 |
| 5,643,527 | 7/1997 | Carroll ................................. 264/500 |
| 5,716,560 | 2/1998 | Heuchert et al. . |
| 5,902,541 * | 5/1999 | Imai et al. ........................... 264/572 |

FOREIGN PATENT DOCUMENTS

| | | | |
|---|---|---|---|
| 61-12314(A) | 1/1986 | (JP) | ............................... B29C/45/14 |
| 61-121915 | 6/1986 | (JP) | ............................... B29C/45/26 |
| 10058493 | 3/1998 | (JP) | ............................... B29C/45/26 |
| 304141 | 2/1972 | (SU) | ............................... B29F/1/100 |
| WO 90/06220 | 6/1990 | (WO) | ............................ B29C/45/34 |
| WO 93/01039 | 1/1993 | (WO) | ............................ B29C/45/17 |
| WO 93/14918 | 8/1993 | (WO) | ............................ B29C/45/17 |

* cited by examiner

PROCESS FOR CONTROLLING GAS BLANKET EXTENT IN PLASTICS INJECTION MOLDING

BACKGROUND OF THE INVENTION

Pressurized gas injection between a molten or cooling plastic and a molding tool wall has been used as a technique for improving the surface quality of molded articles. For example, German patent document DE 195 16 290 C2 describes a plastic molding process in which, after the introduction of the plastic melt into the mold cavity, pressurized gas is injected through a fluid injection nozzle, so that a fluid blanket is created between the cavity wall and the plastic. A gas nozzle with a gap-shaped opening is used for this injection. Constrictions or wings are provided to limit the spread of the gas blanket.

Another process is known from WO 90/06220. A quantity of plastic melt, sufficient for the formation of a molded part, is introduced into the cavity of an injection molding tool. It is recognized that the plastic is subject to shrinking during the cooling process, and consequently, sink marks will typically occur. In order to avoid this, the pressurized gas is also introduced here, between the cavity surface and the molten plastic, as a blanket. Thus, the blanket is built up in a targeted manner and can be later removed.

WO 90/06220 describes two solutions for controlling the gas blanket. First, valves are provided that make possible gas sealing. By actuating, i.e., axial adjustment, of the valve shaft, the valve is selectively converted between the "open" and "closed" positions. Thus, the desired gas blanket can be created and removed in combination with the appropriate gas control. Alternatively, a porous sintered metal can be used. At the transition site in the molding tool where the gas blanket will be produced, a porous metal element is provided, through which pressurized gas, but not molten plastic, can flow. Therefore, targeted gassing is achieved without backflow of molten plastic. Detailed information on control of the extent of this gas pocket, however, is not found in the publication.

Others, however, have proposed techniques to control the size of the gas pocket. WO 93/01039, like DE 195 16 290, concerns the creation of the gas blanket between the cavity surface and the molten plastic and its restriction such that the blanket does not spread undesirably. The solution is to roughen the cavity surface where the gas blanket will be constructed to facilitate gas diffusion, and form smooth cavity surfaces elsewhere.

SUMMARY OF THE INVENTION

The solutions proposed for limiting the gas blanket, however, are not applicable to or successful in all cases.

The present invention concerns a process and device that makes it possible to achieve a precisely defined limit for the gas blanket, so that it is controlled to spread only in a desired region.

The invention concerns a process for the injection molding of plastic objects from thermoplastic, duraplastic or elastomeric material, which has the steps of injecting a sufficient quantity of molten plastic into the cavity of a mold along a plastic melt flow path, which extends from a unit for plasticizing and injecting the plastic through a plastic injection nozzle into the mold; and introducing pressurized fluid, particularly a pressurized gas, from one wall of the cavity by means of at least one fluid injection element, so that a fluid blanket forms between the wall of the cavity and the plastic melt. The molted plastic part thus produced is then allowed to harden. Finally, the cavity is relieved of the pressure of the pressurized fluid and the part demolded.

Further, the invention concerns a device for conducting the process.

The invention is characterized in that at least one surface projection is provided in the cavity wall of the mold. The upper plateau of the projection should be essentially parallel to the cavity wall and is preferably flat. The pressurized fluid is injected into the region of the upper plateau of the projection by the fluid injection element, so that a fluid blanket forms between the plastic and upper plateau.

The process is based on the understanding that good surface characteristics for the molted part cannot be obtained without the operation of the gas blanket between the cavity wall and the plastic. The extent of the blanket, however, is controlled by means of a defined face of the plateau, which is gas sealed at its side surfaces. The gas blanket can form only in the region of the upper plateau; the gas bubble cannot extend or bleed out from the region of the surface projection.

In order to be certain that the gas pocket does not spread out over the upper plateau of the projection, it is further provided that the side surfaces or walls of the surface projection are tempered so that the localized solidification behavior of the plastic is controllable. Independent of whether thermoplast or duroplast is processed, lateral or side regions of the projection are preferably either heated or cooled for a predetermined time.

For example, if the lateral regions are cooled for a specific time in the processing of a thermoplast, a more rapid solidification of the plastic occurs there. The solidified regions form a gas seal surrounding the upper plateau of the surface projection, where the gas blanket is found, so that spreading of the blanket is prohibited.

Advantageously, it is further provided that the injection of the plastic melt is conducted in such a way that prior to the introduction of the pressurized fluid between the wall of cavity and the plastic melt, the cavity of the mold is completely filled with the plastic melt using a plastic melt pressure such that the plastic material remains prestressed during the first phase of the solidification. Thus the entire surface of the flat projection is reliably brought into contact with the molten plastic, so that defined marginal conditions at the side surfaces are created in order to carry-out the invention. Generally, this could not necessarily be assured, if the cavity were only partially filled, since then the sealing at the side surfaces of the flat projection would not be complete. This effect could lead to the failure of the inventive process.

According to a specific embodiment, it is further provided that the introduction of the fluid through the fluid injection element is controlled or regulated as a function of the pressure prevailing in the cavity and/or as a function of the time that has elapsed since the beginning of the injection of the plastic melt and/or as a function of the injection path of the extruder screw. Further, the pressure of the pressurized fluid, which is introduced into cavity via fluid injection element, can be controlled or regulated according to a predetermined time profile.

In general according to another aspect, the device according to the invention has a mold with a cavity comprised of typically of two or more sections. A unit for plasticizing and injecting the plastic produces the plastic melt for filling a cavity of the mold via a plastic injection nozzle. At least one fluid injection element introduces pressurized fluid, particularly pressurized gas, from one wall of the cavity into the cavity, so that a fluid blanket forms between the wall and the plastic melt, which has been introduced into mold. At least one projection is introduced on a wall of the cavity and preferably runs generally parallel to the cavity wall in the region of its upper plateau. At least one fluid injection element is integrated in such a way that fluid blanket forms between the plastic and the upper plateau of the flat projection after gas injection through the fluid injection element.

As has been explained above, tempering elements are preferably arranged on or near the lateral side wall of the projection, and the temperature of the plastic is locally controlled with these elements. The tempering element may heat or cool as dictated by the type of plastic used.

It is possible that the fluid injection nozzles have a gap-shaped nozzle that opens into the cavity in a flush arrangement with the upper plateau of the flat projection. Alternatively, it may also may be provided that the fluid injection nozzles are comprised of micro-porous metal at their end region and fluid injection nozzle is arranged such that it connects flush with the upper plateau of the flat projection.

The flat projection preferably has a rectangular shape. Further, several such flat projections can be provided, which run together at one location. In this case, advantageously, a common fluid injection nozzle is assigned to the several surface projections, and this nozzle is arranged at a convergent location.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE INVENTION

Figure 1:
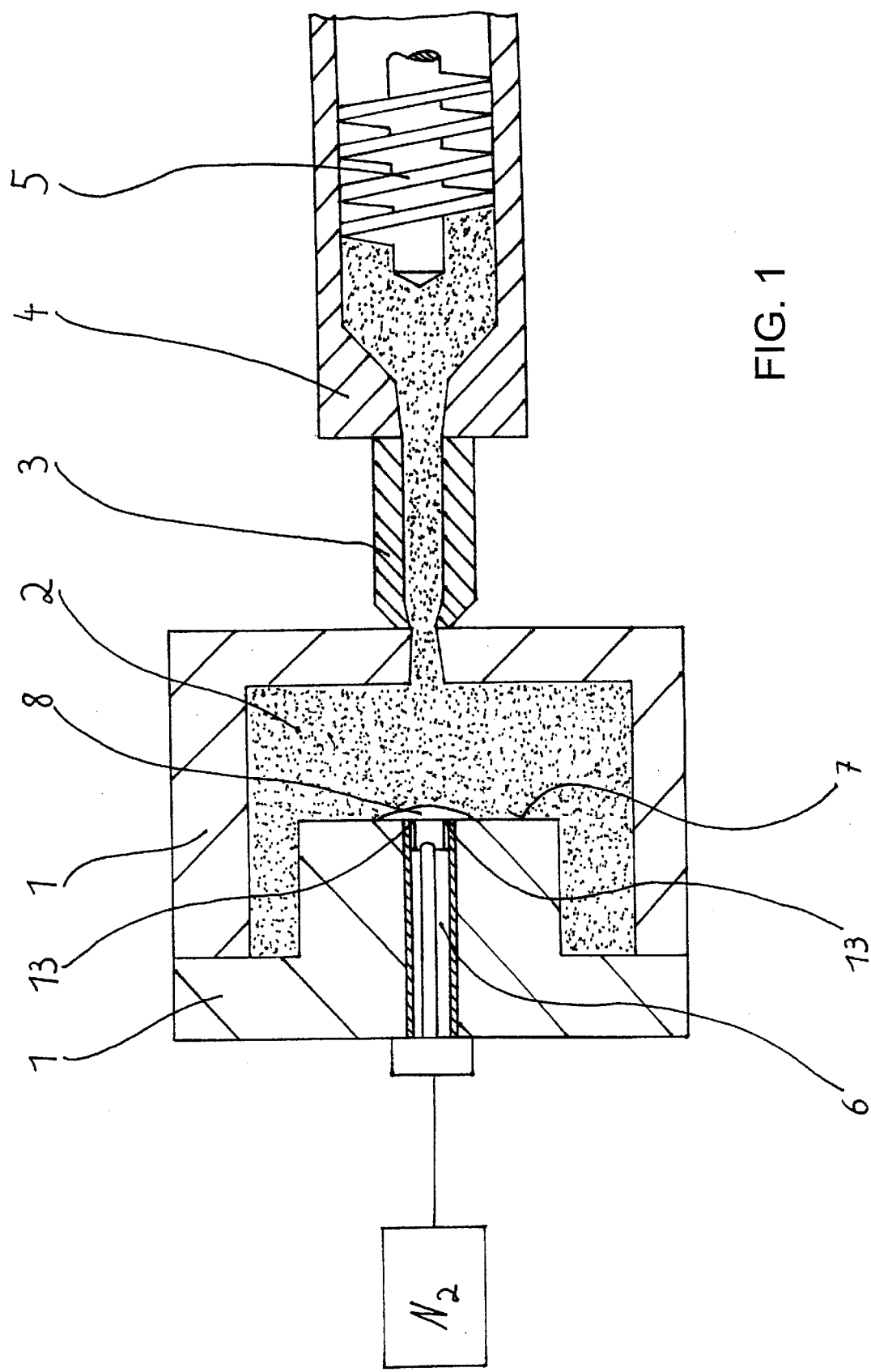
FIG. 1 shows schematically the injection molding device of the invention.

An injection molding device constructed according to the principles of the present invention is shown in FIG. 1. The two-part injection mold 1 has a cavity 2, which defines the geometry or shape of the molded part to be produced. The cavity 2 is provided with a plastic melt, which is produced in a unit for plasticizing and injecting plastic. The plasticizing and injection unit is comprised of an extruder screw 5 and screw cylinder 4. The plastic melt is injected into mold 1 through a plastic injection nozzle 3.

A fluid injection nozzle 6 is arranged in the region of one of the cavity walls. Its gas outlet opening is comprised of a gap-shaped opening 13. Thus, it is possible, when the cavity is filled with plastic melt, to introduce nitrogen gas ($N_2$) between wall 7 of cavity 2 and the plastic melt, so that a fluid blanket 8 is formed.

Figure 2:
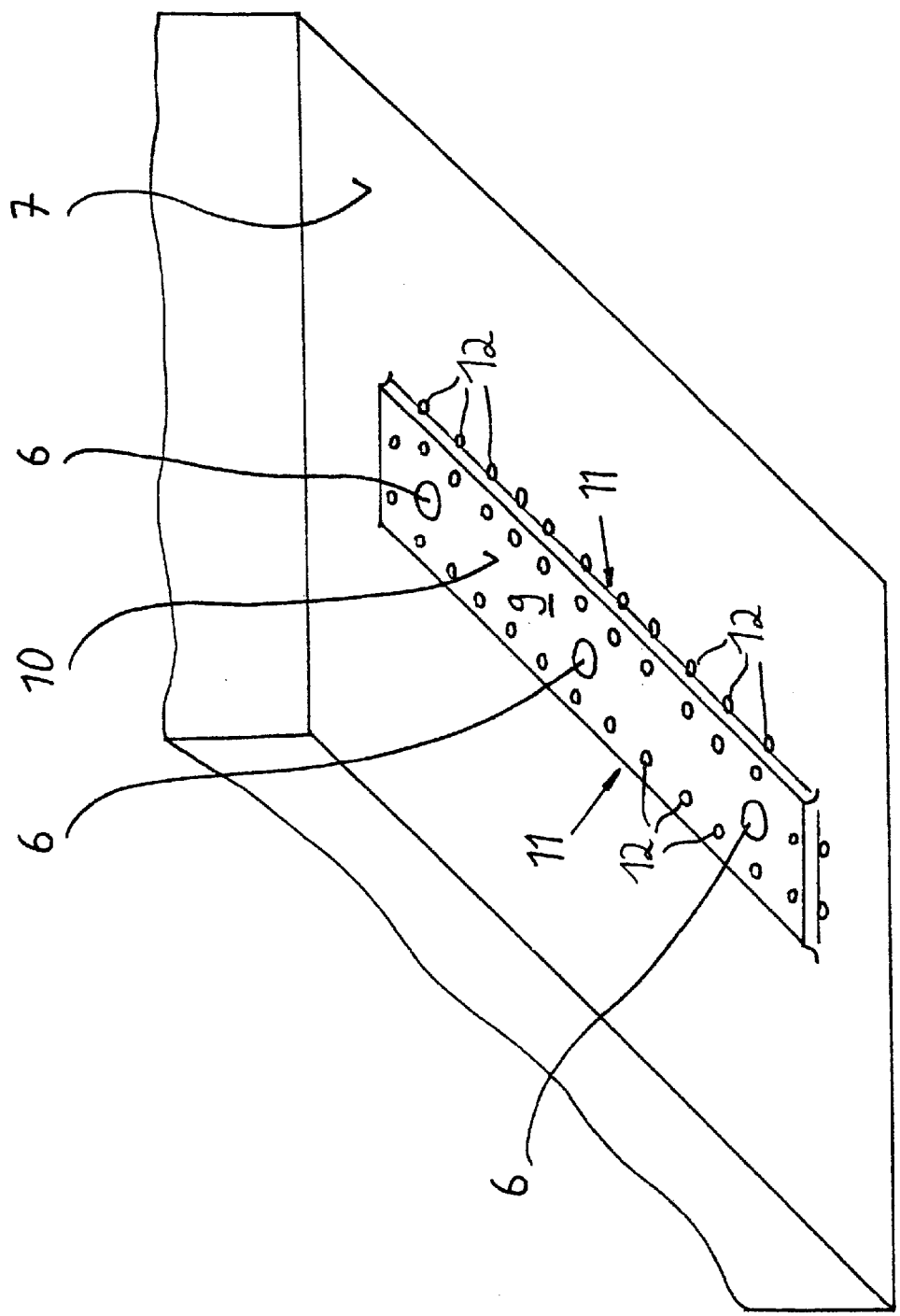
FIG. 2 is perspective view the surface of the cavity with a surface projection.

According to the invention, the blanket 8 is confined only in a desired region as follows. A surface projection 9 is arranged on wall 7 of cavity 2–see FIG. 2. Usually, the appropriate configuration is created in the cavity at the time of manufacturing the mold. However, the projection 9 can also be retrofitted on the cavity surface. The surface projection, as can be seen in FIG. 2, is comprised of a projection, which has an upper plateau 10, which runs parallel to the surrounding, adjacent cavity wall 7. The lateral regions or walls 11 create the transition from the deeper-lying level of cavity surface 7 and the level of upper plateau 10.

The height of upper plateau 10 above cavity surface 7 need not be very large. In one embodiment, the surface projection is for the most part only slightly more than one millimeter high. In extreme cases, the heights between 0.15 millimeters to or up to 5 millimeters may be used. Generally, selection of the height depends on the molded part concerned.

In the region of the upper plateau, at least one fluid injection nozzle 6 is integrated. There are three nozzles 6 in the illustrated case. In order to assure a seal between wall 7 of the cavity and upper plateau 10, several tempering elements 12 are arranged in the lateral region 11 of surface projection 9. The consistency of the plastic is influenced by appropriate control of tempering elements (heating or cooling).

It is first of all possible, for example, to undertake a heating of the lateral regions in the case of thermoplast processing in order to realize the seal by liquid plastic—in conjunction with a sufficiently high plastic melt post-pressure. On the other hand, solidification is obtained also, in an inverse manner, so that the gas blanket does not extend over this region.

Figure 3:
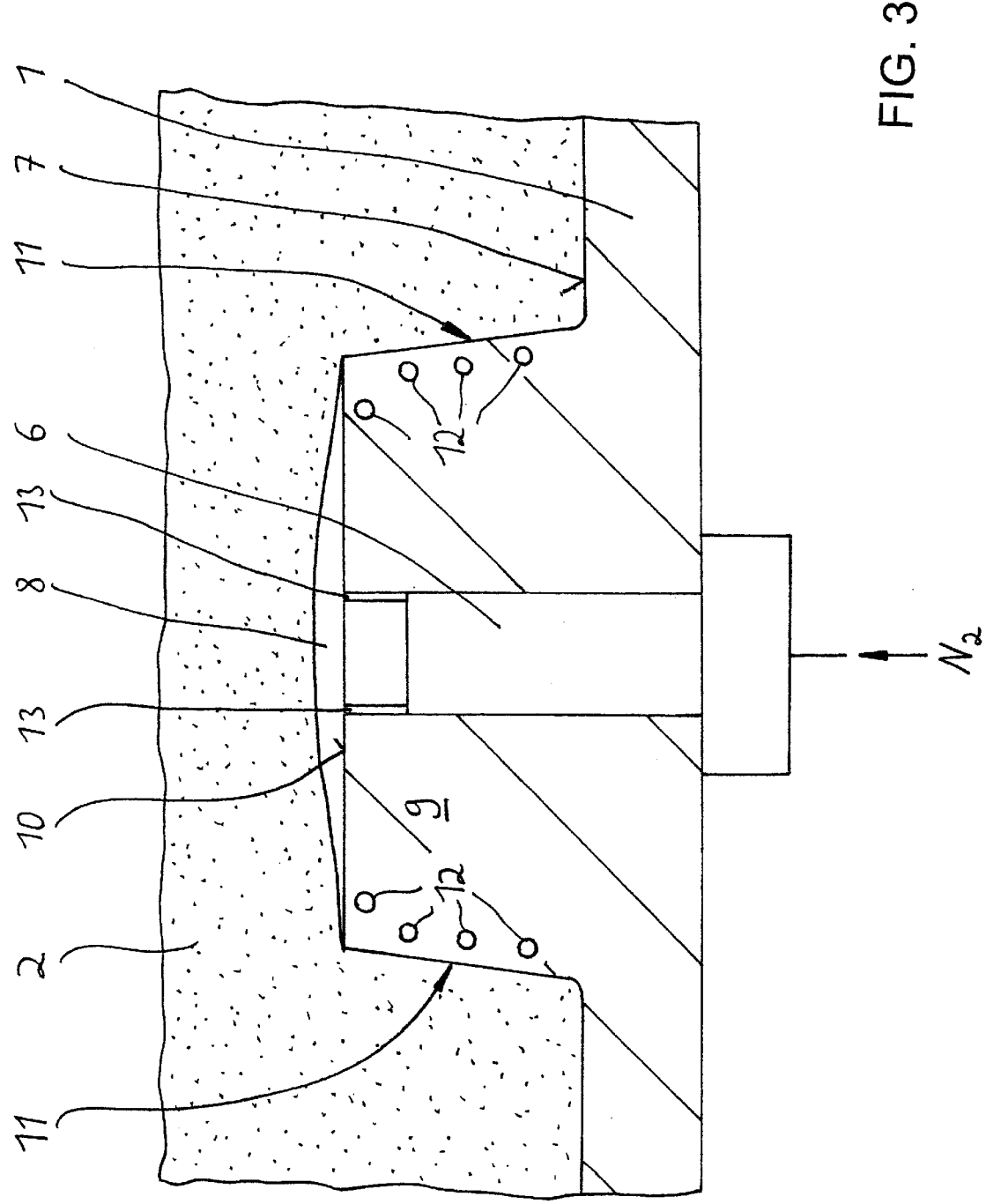
FIG. 3 is cross section and detailed view of the surface projection.

These conditions are shown in detail in FIG. 3. Here, an enlargement of the region of surface projection 9 is shown in cross section. A bore hole for fluid injection nozzle 6 is introduced in the wall region in the mold 1. Surface projection 9 is arranged on wall 7 of cavity 2. The outlet end of fluid injection nozzle 6, i.e. the gap-shaped opening 13, is flush with upper plateau 10 of surface projection 9. Lateral regions or walls 11 of the surface projection are formed in a slightly oblique manner in the case shown.

Figure 4:
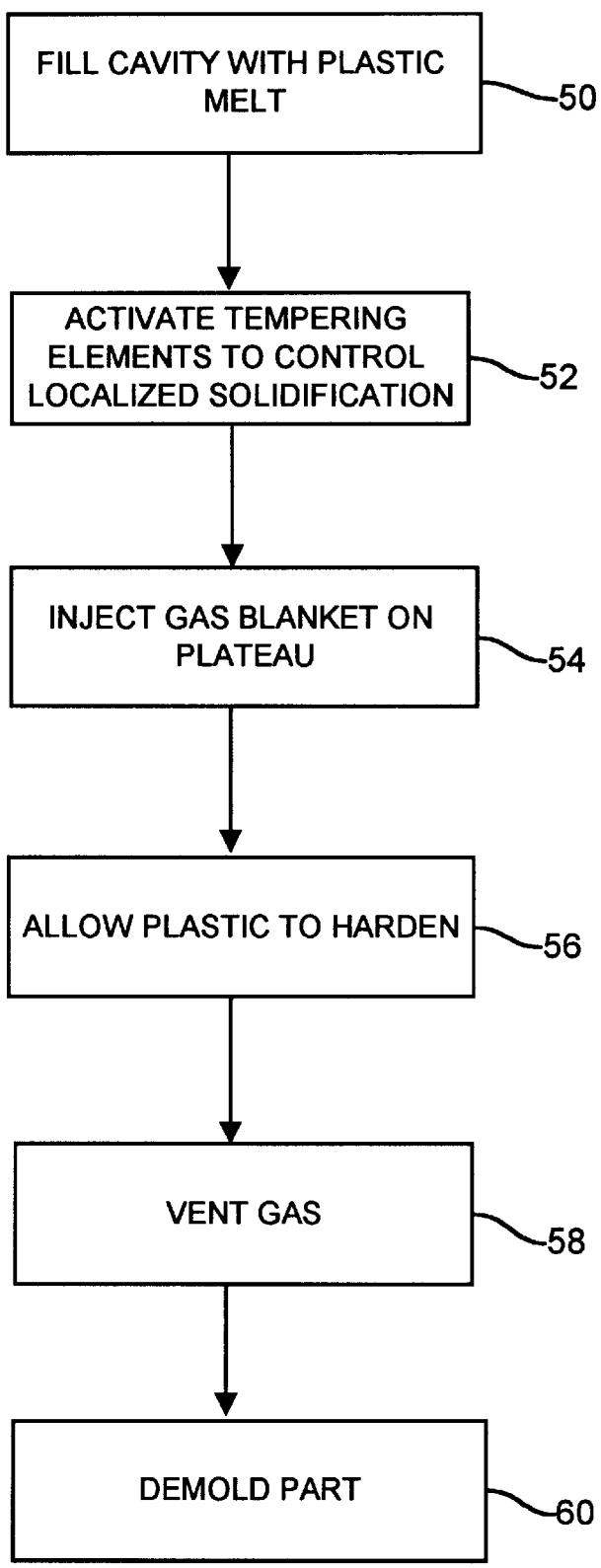
FIG. 4 is a process diagram showing the injection molding process according to the invention.

As shown in FIG. 4, the cavity 2 is first filled with plastic melt in step 50. Preferably, the cavity of the mold is completely filled and pressurized with the plastic melt such that the plastic material remains prestressed during the first phase of the solidification. Thus the entire surface of the flat projection is reliably brought into contact with the molten plastic, so that defined marginal conditions at the side surfaces are created.

In order to assure a seal between cavity wall 7 and upper plateau 10, tempering elements 12 are arranged in the lateral region 11 of surface projection 9, and the solidification or liquid-state of the plastic in this region is targeted by activation of the elements in step 52.

Nitrogen gas is then injected via fluid injection nozzle 7 in step 54. In this way, a fluid blanket 8 forms between upper plateau 10 of surface projection 9 and the plastic melt. Cooling-conditioned shrinkages of the plastic material are equilibrated by the pressure and the fluid blanket, i.e., the plastic material is applied or pushed to the cavity wall that is opposite surface projection 9, so that a perfect surface contour of the molded part is assured there.

The molded part thus produced is then allowed to harden while the blanket continues to press the plastic against the cavity walls in step 56. The gas is vented from the cavity, removing the blanket in step 58, and the part is demolded in step 60.

Figure 5:
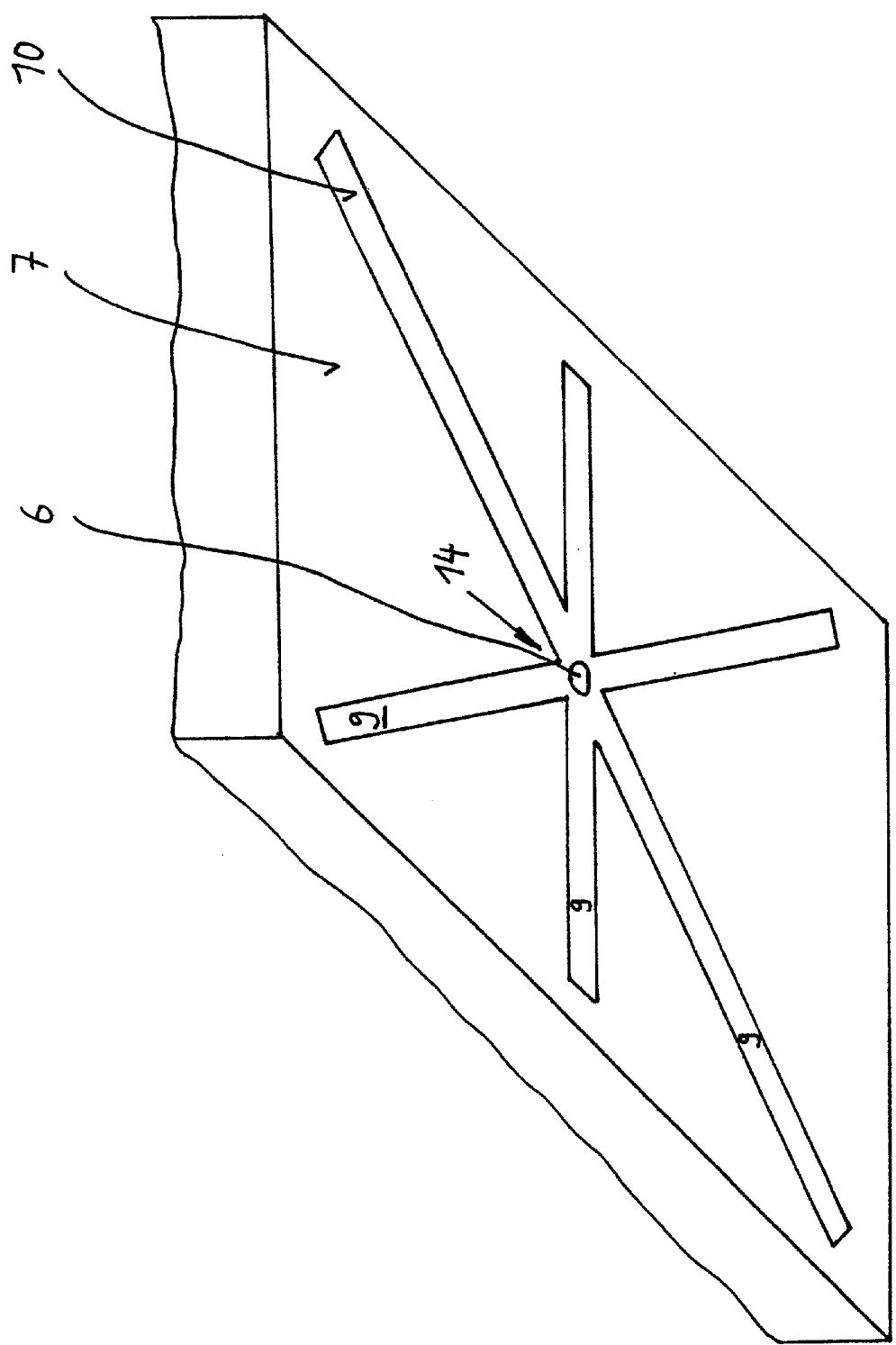
FIG. 5 is a perspective view of the cavity surface with several surface projections.

It can be seen in FIG. 5 how several surface projections 9, each of which has an approximately rectangular shape, cooperate is a star-shaped pattern. The individual projections 9 converge at a convergent point 14. A single fluid injection nozzle is located there, although, generally, several nozzles are useful in other embodiments. With the arrangement shown, a glass blanket is introduced over wide regions of cavity wall 7, between respective upper plateau 10 and the plastic melt, so that a gas blanket is introduced onto the major part of the plastic melt.

Figure 6:
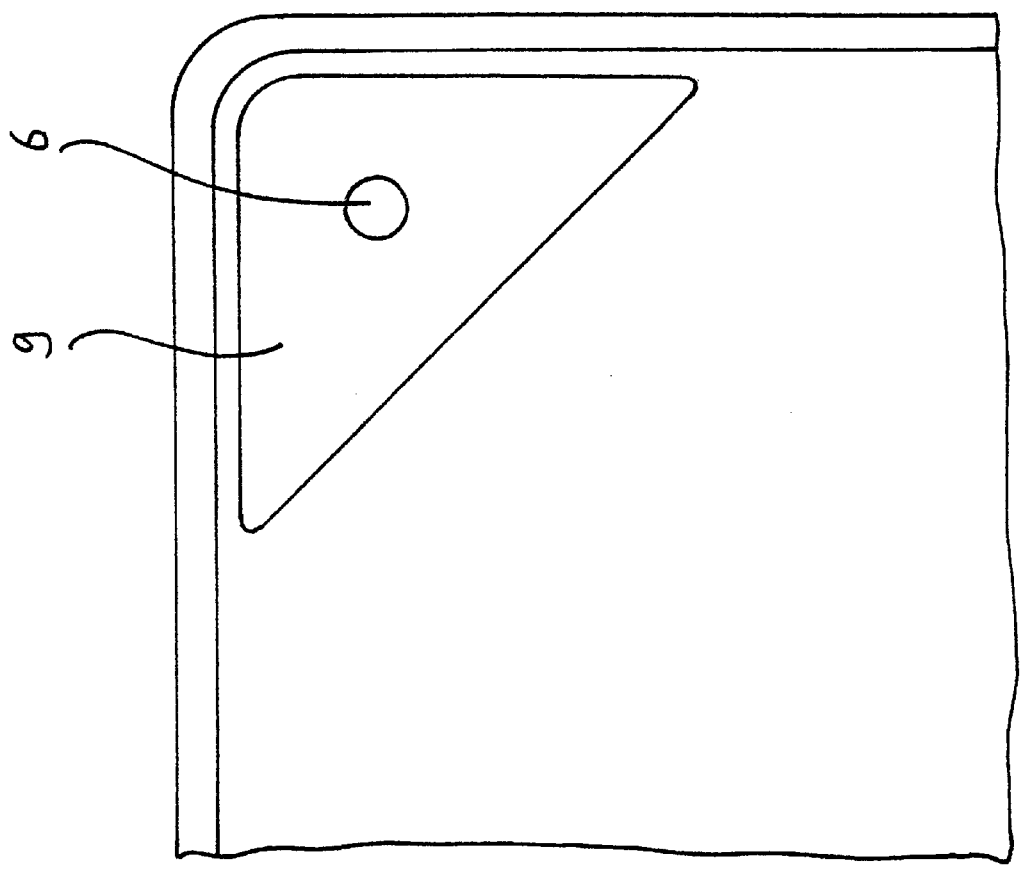
FIG. 6 is a top view showing the arrangement of a surface projection for a special molded part.

Another embodiment is seen in FIG. 6. A portion of a housing is shown that will be injection molded. The corner region is critical, since material accumulations there promote damage to the surface of the molded part due to volume contractions. Thus a surface projection 9 is arranged in a corner region, which is provided centrally with pressurized gas from a gas injection nozzle 6. A gas blanket is produced thus in the entire corner region, so that no sink holes occur.

A variety of lateral cross-sections for the surface projections 9 are shown in FIGS. 7A–7D.

Figure 7A:
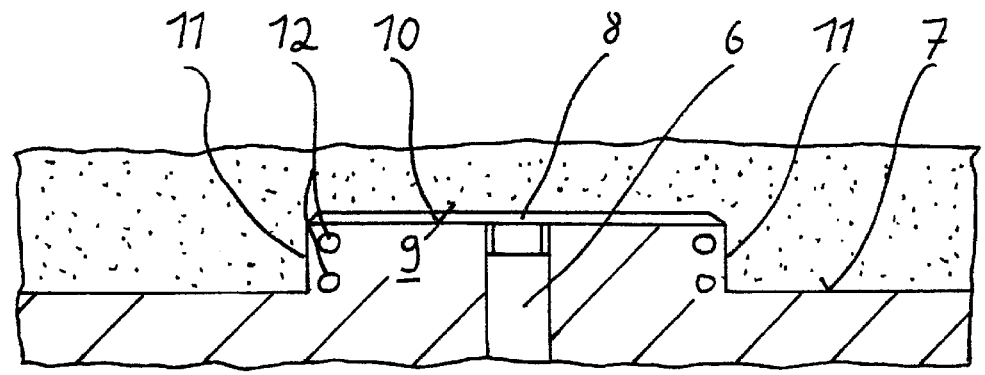
FIGS. 7A–7D show different configurations of the surface projection.

FIG. 7A shows the simplest case, i.e., the side walls 11 of the surface projection 9 extend perpendicularly from cavity wall 7. Gas pocket 10 that forms by the introduction of the pressurized fluid via fluid injection nozzle 6 is shown. The upper plateau 10 runs in parallel to cavity wall 7.

Figure 7B:
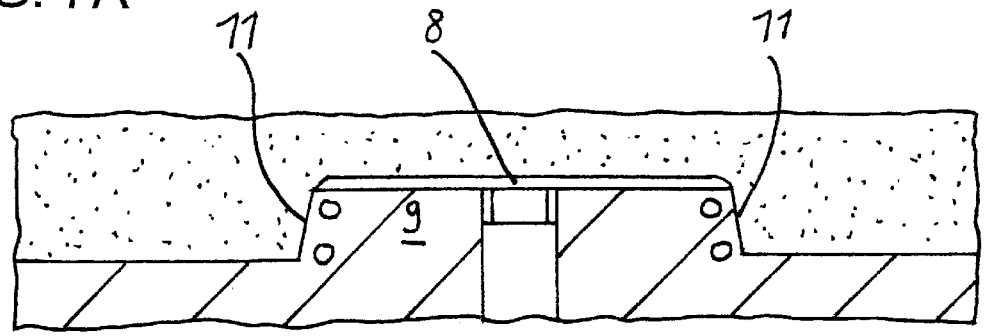

A somewhat different structure is shown in FIG. 7B. The lateral regions or walls 11 are slightly oblique. This simplifies the later demolding of the finished molded part.

Figure 7C:
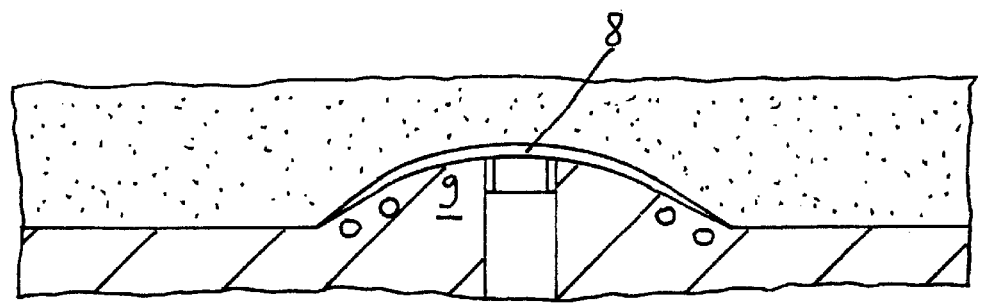

Another case is shown in FIG. 7C. Here, the surface projection is formed like a mushroom.

Figure 7D:
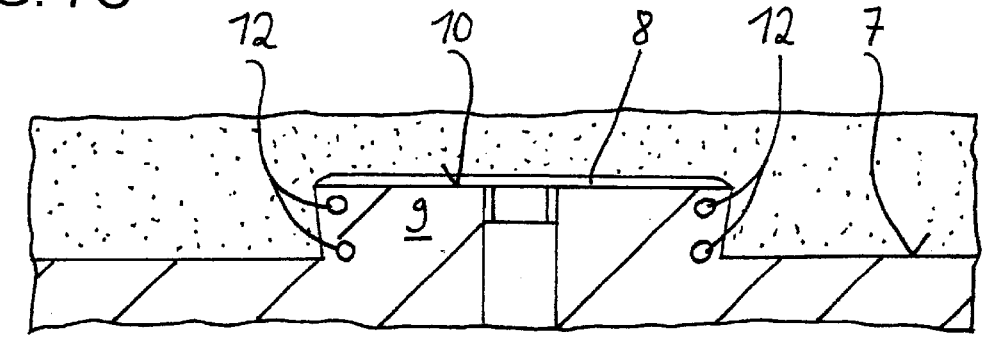

Finally, in FIG. 7D, a slightly dove-tailed contour is shown and also possible for the surface projection 9. In fact, a slight undercut results, which somewhat inhibits the demolding of the finished part; the extent to which depends on the elasticity of the hardened material. Advantageously, however, a particularly good seal of gas pocket 8 is produced in the region of upper plateau 10, which is supported by tempering elements 12 in the above-mentioned manner.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A process for the injection molding of a plastic object, comprising:

injecting a sufficient quantity of molten plastic into a cavity of a mold along a melt flow path, which extends from a plasticizing and injection unit through a plastic injection nozzle into the mold, the mold including a surface projection from a wall of the cavity into the cavity, the surface projection having lateral regions;

tempering the lateral regions of the surface projection causing an increased solidification of the molten plastic in the lateral regions;

introducing a pressurized fluid into a region limited to an upper plateau surface projection on the wall of the cavity into the molten plastic, the pressurized fluid forming a fluid blanket limited to a space between the plastic and upper plateau of the surface projection, the plastic forming a gas seal surrounding the upper plateau of the surface projection;

allowing the molded part thus produced to harden;

relieving cavity of the pressure of the pressurized fluid; and demolding the molded part.

2. A process according to claim 1, further comprising tempering lateral regions of the surface projection to control a local solidification behavior of the plastic.

3. A process according to claim 2, further comprising heating the lateral regions for a predetermined time.

4. A process according to claim 2, further comprising cooling the lateral regions for a predetermined time.

5. A process according to claim 1, further comprising completely filling the cavity with molten plastic such that the plastic material remains pre-stressed during initial solidification.

6. A process according to claim 1, further comprising regulating the introduction of the fluid as a function of the pressure prevailing in the cavity and/or as a function of the time elapsed since the beginning of the injection of the plastic melt.

7. A process according to claim 1, further comprising regulating the pressure of the pressurized fluid according to a predetermined time profile.

8. A process according to claim 1, wherein the plastic is a thermoplast.

9. A process according to claim 1, wherein the plastic is a duroplast.

10. A process according to claim 1, wherein the plastic is an elastomeric material.

11. A process according to claim 1, wherein the upper plateau runs generally parallel to a cavity wall surrounding the surface projection.

\* \* \* \* \*